United States Patent
Nakayama et al.

(10) Patent No.: US 9,169,758 B2
(45) Date of Patent: Oct. 27, 2015

(54) FUEL INJECTION CONTROL SYSTEM OF AN INTERNAL COMBUSTION ENGINE

(75) Inventors: Yusuke Nakayama, Gotemba (JP); Toru Kidokoro, Hadano (JP); Kenji Sakurai, Kyoto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/111,428

(22) PCT Filed: Apr. 13, 2011

(86) PCT No.: PCT/JP2011/059196
§ 371 (c)(1),
(2), (4) Date: Oct. 11, 2013

(87) PCT Pub. No.: WO2012/140753
PCT Pub. Date: Oct. 18, 2012

(65) Prior Publication Data
US 2014/0033687 A1    Feb. 6, 2014

(51) Int. Cl.
*F01N 3/18* (2006.01)
*F02D 19/10* (2006.01)
*F01N 13/00* (2010.01)
*F01N 3/08* (2006.01)
*F01N 3/10* (2006.01)

(52) U.S. Cl.
CPC ............ *F01N 3/18* (2013.01); *F01N 13/009* (2014.06); *F02D 19/105* (2013.01); *F01N 3/0814* (2013.01); *F01N 3/0842* (2013.01); *F01N 3/101* (2013.01); *Y02T 10/22* (2013.01); *Y02T 10/36* (2013.01)

(58) Field of Classification Search
CPC ... F01N 3/0835; F01N 3/101; F02D 19/0615; F02D 19/0647; F02D 19/081; F02D 19/105; F02D 41/0024; F02D 41/0027; F02D 41/0255; F02D 41/0615; F02D 41/068; F02D 41/081
USPC .................................................. 123/304, 575
See application file for complete search history.

(56) References Cited

FOREIGN PATENT DOCUMENTS

| JP | 11062561 A | * | 3/1999 | ................ F01N 3/20 |
| JP | 2002-038980 A | | 2/2002 | |
| JP | 2004-239132 A | | 8/2004 | |

OTHER PUBLICATIONS

Machine translation of JP11-62561A, accessed Sep. 26, 2014.*

* cited by examiner

*Primary Examiner* — Audrey K Bradley
*Assistant Examiner* — Jonathan Matthias
(74) *Attorney, Agent, or Firm* — Sughrue Mion, PLLC (57) ABSTRACT

The present invention has its object to provide a technique which can eliminate HC poisoning of an exhaust gas purification catalyst in a suitable manner in a fuel injection control system of an internal combustion engine which can use a liquid fuel and a gas fuel. In order to achieve this object, the present invention is constructed such that in the fuel injection control system of an internal combustion engine capable of using a liquid fuel and a gas fuel, when HC poisoning of the exhaust gas purification catalyst has occurred, HC poisoning is intended to be eliminated by causing the internal combustion engine to operate by the use of the gas fuel if the temperature of the exhaust gas purification catalyst is less than a specified value, whereas the elimination of HC poisoning is intended by causing the internal combustion engine to operate by the use of the liquid fuel if the temperature of an exhaust gas purification device is not less than the specified value.

8 Claims, 4 Drawing Sheets

FIG.1

| ENGINE LOAD / FUEL USED | LOW | HIGH |
|---|---|---|
| GAS FUEL | ELIMINATION | ELIMINATION |
| LIQUID FUEL | POISONING | ELIMINATION |

FUEL INJECTION CONTROL SYSTEM OF AN INTERNAL COMBUSTION ENGINE

CROSS REFERENCE TO RELATED APPLICATIONS

This application is a National Stage of International Application No. PCT/JP2011/059196 filed Apr. 13, 2011, the contents of all of which are incorporated herein by reference in their entirety.

TECHNICAL FIELD

The present invention relates to a control technique for an internal combustion engine which is able to use a plurality of kinds of fuels.

BACKGROUND ART

In recent years, there have been proposed internal combustion engines which can be operated by the use of a plurality of kinds of fuels. In such internal combustion engines, there has been proposed a technique in which a gas fuel (CNG: Compressed Natural Gas) is used during a period of time from engine starting until a catalyst for exhaust gas purification becomes activated, and a liquid fuel (gasoline) is used after the exhaust gas purification catalyst has been activated (see, for example, a first patent document).

In addition, there has also been proposed a technique in which in an internal combustion engine capable of using a plurality of kinds of fuels, a liquid fuel is used at the time of carrying out $NO_X$ reduction treatment of an $NO_X$ storage reduction catalyst which is arranged in an exhaust system of the internal combustion engine (see, for example, a second patent document).

PRIOR ART DOCUMENTS

Patent Documents

Patent Document 1: Japanese patent application laid-open No. 2002-038980
Patent Document 2: Japanese patent application laid-open No. 2004-239132

DISCLOSURE OF THE INVENTION

Problem to be Solved by the Invention

On the other hand, a reduction in exhaust emissions may be intended by causing $NO_X$ contained in an exhaust gas to be adsorbed to an exhaust gas purification catalyst such as a three-way catalyst, at the cold time of an internal combustion engine, such as at the time of starting thereof, at the time of warming-up operation thereof, or the like.

However, in cases where nonmethane hydrocarbon is contained in the exhaust gas of the internal combustion engine, the nonmethane hydrocarbon is adsorbed to the three-way catalyst in preference to $NO_X$. As a result, there will occur a phenomenon (HC poisoning) in which a surface of the exhaust gas purification catalyst is covered with the hydrocarbon. In particular, when the internal combustion engine is operated by means of a liquid fuel such as gasoline or the like, the nonmethane hydrocarbon contained in the exhaust gas will increase, so the above-mentioned HC poisoning is liable to occur. When HC poisoning of the exhaust gas purification catalyst occurs, $NO_X$ which is adsorbed to the exhaust gas purification catalyst will decrease, so there will be a fear that exhaust emissions may increase.

The present invention has been made in view of the circumstances as referred to above, and its object is to provide a technique which can eliminate HC poisoning of an exhaust gas purification catalyst in a suitable manner in a fuel injection control system of an internal combustion engine which can use a liquid fuel and a gas fuel.

Means for Solving the Problem

In order to solve the above-mentioned problems, the present invention is constructed such that in a fuel injection control system of an internal combustion engine capable of using a liquid fuel and a gas fuel, a fuel to be used for the internal combustion engine is selected in accordance with the temperature of an exhaust gas purification catalyst at the time when HC poisoning of the exhaust gas purification catalyst has occurred.

Specifically, the present invention is constructed such that, in a fuel injection control system of an internal combustion engine which is capable of using a liquid fuel and a gas fuel, provision is made for:

an obtaining unit that obtains the temperature of an exhaust gas purification catalyst which is arranged in an exhaust passage of the internal combustion engine; and a control unit that, at the time when HC poisoning of said exhaust gas purification catalyst has occurred, causes the internal combustion engine to operate with the gas fuel if the temperature obtained by said obtaining unit is less than a specified value, and causes the internal combustion engine to operate with the liquid fuel if the temperature obtained by said obtaining unit is not less than the specified value.

As a result of keen and earnest experiments and verification of the inventor of the present application, it has been found that if the internal combustion engine is driven to operate with the gas fuel at the time when HC poisoning of the exhaust gas purification catalyst has occurred, the hydrocarbon which covers a surface of the exhaust gas purification catalyst is oxidized and removed in a quick manner.

According to the above-mentioned finding or knowledge, if the internal combustion engine is operated with the gas fuel at the time when HC poisoning of the exhaust gas purification catalyst has occurred, it will become possible to eliminate HC poisoning of the exhaust gas purification catalyst. However, the gas fuel is low in energy storage density as compared with the liquid fuel, and hence, there is a possibility that an amount of the gas fuel, which can be carried or stored on a vehicle such as an automobile or the like, may become smaller than that of the liquid fuel. Therefore, when the gas fuel is used each time HC poisoning of the exhaust gas purification catalyst occurs, the amount of consumption of the gas fuel may become excessively large. As a result, there is a possibility that it becomes necessary to supply the gas fuel frequently or it becomes impossible to use the gas fuel in an operating region in which the gas fuel should be used.

On the other hand, the fuel injection control system of an internal combustion engine of the present invention operates in such a manner that in cases where HC poisoning has occurred, the internal combustion engine is caused to operate with the gas fuel when the temperature of the exhaust gas purification catalyst is less than the specified value, whereas the internal combustion engine is caused to operate with the liquid fuel when the temperature of the exhaust gas purification catalyst is not less than the specified value. The "specified value" referred to herein is a temperature of the exhaust gas purification catalyst at which the amount of elimination of HC poisoning per unit time (e.g., the amount of HC which is oxidized by the exhaust gas purification catalyst) is considered to be more with respect to the amount of HC poisoning per unit time (e.g., the amount of HC adhering to the exhaust gas purification catalyst), in the case where the internal combustion engine is operated with the liquid fuel.

According to such a fuel injection control system of an internal combustion engine, it becomes possible to eliminate HC poisoning of the exhaust gas purification catalyst, while suppressing the amount of consumption of the gas fuel to a low level.

In the fuel injection control system of an internal combustion engine according to the present invention, when a remaining amount of the gas fuel is large, the specified value may be made higher in comparison with the time when the remaining amount of the gas fuel is small. If the specified value is set in this manner, it is possible to suppress the gas fuel, which is consumed to eliminate HC poisoning of the exhaust gas purification catalyst at the time when the remaining amount of the gas fuel is small, to a low level. As a result, a situation can be avoided where the frequency at which the gas fuel is supplied becomes excessively large or where it becomes impossible to use the gas fuel in the operating region in which the gas fuel should be used.

The fuel injection control system of an internal combustion engine according to the present invention may be further provided with:

a calculation unit that calculates a first integrated value, which is an integrated value of a period of time for which the internal combustion engine is operated in an operation region in which HC poisoning is facilitated (hereinafter referred to as "a poisoning operation region"), and a second integrated value, which is an integrated value of a period of time for which the internal combustion engine is operated in an operation region in which HC poisoning is eliminated (hereinafter referred to as "a elimination operation region"); and a determination unit that makes a determination that HC poisoning of the exhaust gas purification catalyst has occurred, at the time when a value obtained by subtracting the second integrated value from the first integrated value exceeds an upper limit value.

Said poisoning operation region is, for example, a region where the internal combustion engine is operated to perform a low load operation using the liquid fuel. In addition, said elimination operation region is, for example, a region where the internal combustion engine is operated by the use of the gas fuel, and a region where the internal combustion engine is operated to perform a high load operation using the liquid fuel.

The "low load operation" referred to herein is, for example, an operation region in which the amount of HC poisoning per unit time is considered to exceed the amount of elimination of HC poisoning per unit time, or an operation region in which the amount of HC which flows into the exhaust gas purification catalyst per unit time is considered to exceed the amount of HC which is oxidized by the exhaust gas purification catalyst per unit time. In addition, the "high load operation" referred to herein is, for example, an operation region in which the amount of HC poisoning per unit time is considered to fall below the amount of elimination of HC poisoning per unit time, or an operation region in which the amount of HC which flows into the exhaust gas purification catalyst per unit time is considered to fall below the amount of HC which is oxidized by the exhaust gas purification catalyst per unit time.

Therefore, said determination unit can subtract a sum of (hereinafter referred to as "an integrated elimination time") of an integrated value of a period of time in which the internal combustion engine has been operated using the gas fuel and an integrated value of a period of time in which the internal combustion engine has performed the high load operation using the liquid fuel, from an integrated value of a period of time in which the internal combustion engine has performed the low load operation using the liquid fuel (hereinafter referred to as an "integrated poisoning period of time"), and can make a determination that HC poisoning of the exhaust gas purification catalyst has occurred, in cases where the subtraction value (=(integrated poisoning period of time)−(integrated elimination time)) reaches a value equal to or larger than an upper limit value. In addition, said determination unit may make a determination that it is necessary to eliminate HC poisoning of the exhaust gas purification catalyst, in cases where the internal combustion engine has performed the low load operation using the liquid fuel at the time of the last stop of the internal combustion engine. Here, note that the "upper limit value" referred to herein is a value from which it is considered that an amount of exhaust emissions resulting from HC poisoning exceeds a regulated value.

When a condition for carrying out the HC poisoning elimination processing is determined in this manner, it becomes possible to eliminate HC poisoning of the exhaust gas purification catalyst, while suppressing the amount of consumption of the gas fuel to a further small level.

Effects of the Invention

According to the present invention, in a fuel injection control system of an internal combustion engine capable of using a liquid fuel and a gas fuel, it is possible to eliminate HC poisoning of an exhaust gas purification catalyst in a suitable manner.

THE BEST MODE FOR CARRYING OUT THE INVENTION

Hereinafter, a specific embodiment of the present invention will be described based on the attached drawings. However, the dimensions, materials, shapes, relative arrangements and so on of component parts described in the embodiment are not intended to limit the technical scope of the present invention to these alone in particular as long as there are no specific statements.

Figure 1:
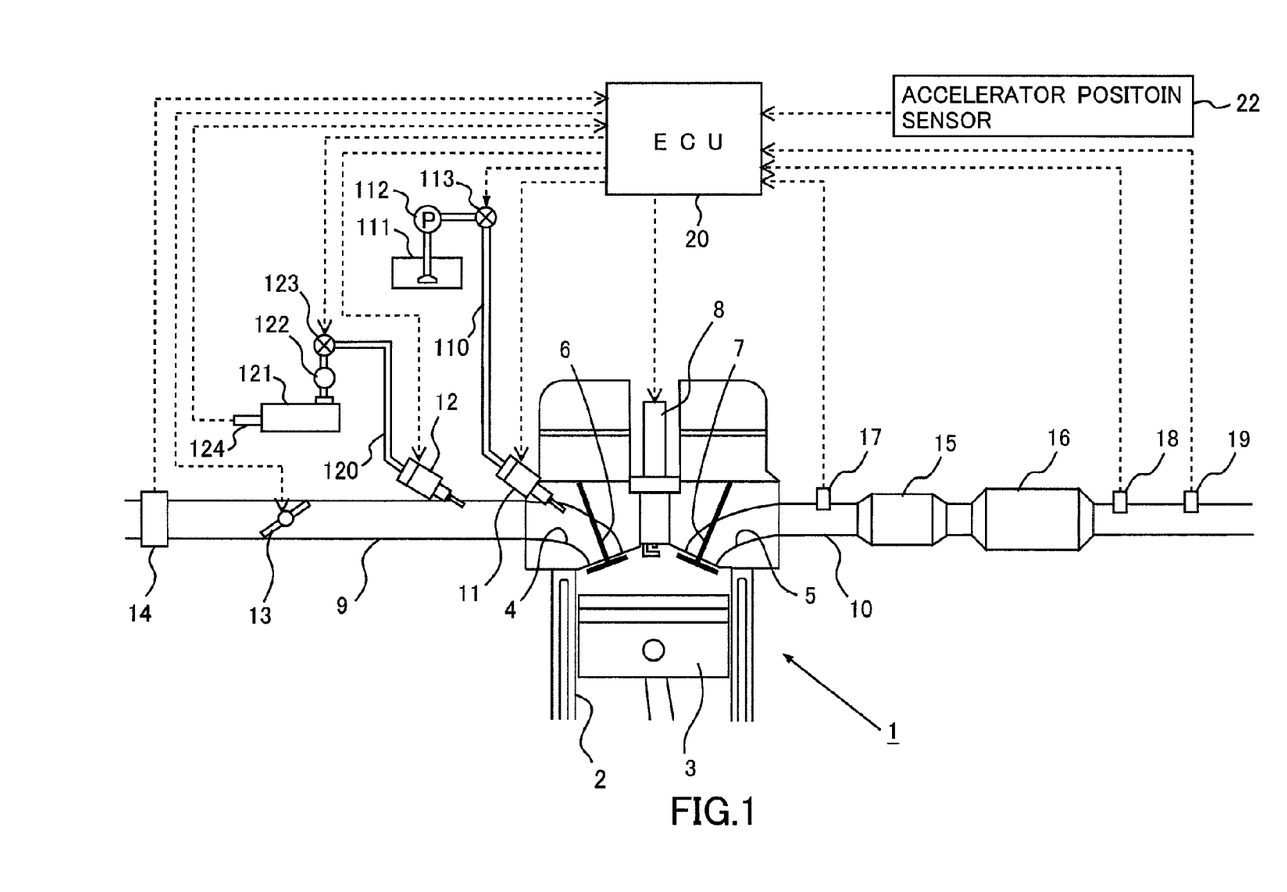
FIG. 1 is a view showing the schematic construction of an internal combustion engine to which the present invention is applied.

FIG. 1 is a view showing the schematic construction of an internal combustion engine to which the present invention is applied. The internal combustion engine 1 shown in FIG. 1 is a spark ignition internal combustion engine capable of using a liquid fuel and a gas fuel. Here, note that as the liquid fuel referred to herein, there can be used petroleum-based liquid fuels such as gasoline, etc., non-methane hydrocarbon fuels such as a mixed liquid fuel in which ethanol, methanol or the like is mixed into a petroleum-based liquid fuel, etc. In addition, as the gas fuel, there can be used compressed natural gas (CNG).

A piston 3 is fitted in a cylinder (each cylinder) 2 of the internal combustion engine 1 for sliding movement relative thereto. The piston 3 is connected with an engine output shaft (crankshaft) through an unillustrated connecting rod. The internal combustion engine 1 is provided with an intake port 4 for introducing fresh air (air) into the cylinder 2, and an exhaust port 5 for discharging burned gas from the interior of the cylinder 2. The internal combustion engine 1 is also provided with an intake valve 6 for opening and closing an opening end of the intake port 4, and an exhaust valve 7 for opening and closing an opening end of the exhaust port 5. The intake valve 6 and the exhaust valve 7 are driven to open and close by means of an unillustrated intake camshaft and an unillustrated exhaust camshaft, respectively. In addition, the internal combustion engine 1 is further provided with a spark plug 8 for generating a spark as a small fire ball or kernel in the cylinder 2.

An intake passage 9 is connected to the above-mentioned intake port 4. The intake passage 9 is a passage for guiding the fresh air (air) taken in from atmospheric air to the intake port 4. On the other hand, an exhaust passage 10 is connected to the above-mentioned exhaust port 5. The exhaust passage 10 is a passage for discharging the burned gas (exhaust gas) which flows out of the exhaust port 5 into atmospheric air, after causing it to pass through exhaust gas purification devices 15, 16 to be described later, etc.

Here, a supply device for supplying the liquid fuel and the gas fuel to the internal combustion engine 1 in a selective manner is arranged in the internal combustion engine 1. The supply device is provided with a first fuel injection valve 11, a first fuel passage 110, a first fuel tank 111, a fuel pump 112, a first cutoff valve 113, a second fuel injection valve 12, a second fuel passage 120, a second fuel tank 121, and a regulator 122. Here, note that the first fuel injection valve 11 and the second fuel injection valve 12 should be arranged for each cylinder, respectively.

The first fuel injection valve 11 is mounted on the internal combustion engine 1 at a location in the vicinity of the intake port 4, and serves to inject the liquid fuel into the intake port 4. The first fuel injection valve 11 is in fluid communication or connection with the first fuel tank 111 through the first fuel passage 110. Between the ends of the first fuel passage 110, there are arranged the fuel pump 112 and the first cutoff valve 113. The fuel pump 112 serves to supply the liquid fuel stored in the first fuel tank 111 to the first fuel injection valve 11. The first cutoff valve 113 is a device which serves to switch over the first fuel passage 110 between a cutoff (blocked) state and a communication state thereof.

The second fuel injection valve 12 is mounted on the above-mentioned intake passage 9 at a location in the vicinity of the above-mentioned intake port 4, and serves to inject the gas fuel into the intake passage 9. The second fuel injection valve 12 is in fluid communication or connection with the second fuel tank (CNG bomb or cylinder) 121 through the second fuel passage 120. Between the ends of the second fuel passage 120, there are arranged the regulator 122 and a second cutoff valve 123. The regulator 122 is a device which serves to reduce the pressure of compressed natural gas (CNG) to a predetermined pressure. The second cutoff valve 123 is a device which serves to switch over the second fuel passage 120 between a cutoff (blocked) state and a communication state thereof. In addition, a residual amount sensor 124, which outputs an electrical signal correlated with the amount of the gas fuel stored in the second fuel tank 121, is mounted on the second fuel tank 121.

Then, a throttle valve 13 is arranged on the intake passage 9 at a location upstream of the above-mentioned second fuel injection valve 12. The throttle valve 13 is a device which adjusts an amount of intake air to be introduced into the cylinder 2 by changing the channel cross section of the intake passage 9. An air flow meter 14 is mounted on the intake passage 9 at a location upstream of the throttle valve 13. The air flow meter 14 is a sensor that outputs an electrical signal which is correlated with an amount (mass) of air flowing in the intake passage 9.

On the above-mentioned exhaust passage 10, there is arranged the first exhaust gas purification device 15. The first exhaust gas purification device 15 includes a three-way catalyst which serves to adsorb nitrogen oxides ($NO_X$) in the exhaust gas when it is in a low temperature state. The first exhaust gas purification device 15 corresponds to an exhaust gas purification catalyst according to the present invention.

The second exhaust gas purification device 16 is arranged on the exhaust passage 10 at a location downstream of the above-mentioned first exhaust gas purification device 15. The second exhaust gas purification device 16 includes a catalyst which serves to adsorb the nitrogen oxides ($NO_X$) in the exhaust gas, similar to the first exhaust gas purification device 15.

An air fuel ratio sensor 17 is arranged on the exhaust passage 10 at a location upstream of the above-mentioned first exhaust gas purification device 15. The air fuel ratio sensor 17 is a sensor that outputs an electrical signal which is correlated with an air fuel ratio of the exhaust gas flowing through the exhaust passage 10. An $O_2$ sensor 18 and an exhaust gas temperature sensor 19 are arranged on the exhaust passage 10 at locations downstream of the second exhaust gas purification device 16. The $O_2$ sensor 18 is a sensor that outputs an electrical signal which is correlated with a concentration of oxygen contained in the exhaust gas. The exhaust gas temperature sensor 19 is a sensor that outputs an electrical signal which is correlated with a temperature of the exhaust gas.

An electronic control unit (ECU) 20 is provided in combination with the internal combustion engine 1 as constructed in this manner. The ECU 20 is constructed such that it is electrically connected to various kinds of sensors such as the air flow meter 14, the air fuel ratio sensor 17, the $O_2$ sensor 18, the exhaust gas temperature sensor 19, etc., as referred to above, so that the output signals of the various kinds of sensors can be inputted to the ECU 20. The ECU 20 is also constructed such that it is electrically connected to various kinds of devices such as the spark plug 8, the first fuel injection valve 11, the second fuel injection valve 12, the throttle valve 13, the fuel pump 112, the first cutoff valve 113, the second cutoff valve 123, etc., as referred to above, so that it can control the various kinds of devices in accordance with the output signals of the above-mentioned various kinds of sensors.

For example, when HC poisoning of the first exhaust gas purification device 15 has occurred, the ECU 20 carries out processing (HC poisoning elimination processing) which eliminates HC poisoning of the first exhaust gas purification device 15. In the following, a method of executing the HC poisoning elimination processing in this embodiment will be described.

The three-way catalyst contained in the first exhaust gas purification device 15 has a property of adsorbing $NO_X$ in the exhaust gas when it is in a low temperature state. For that reason, when the internal combustion engine 1 is in a cold state, $NO_X$ in the exhaust gas is adsorbed to the first exhaust gas purification device 15. As a result, the amount of $NO_X$ to be discharged into the atmospheric air can be suppressed to be small.

However, in cases where non-methane hydrocarbon is contained in the exhaust gas, the non-methane hydrocarbon is adsorbed to the three-way catalyst in preference to the $NO_X$. For that reason, if there occurs HC poisoning in which the surface of the three-way catalyst is covered with HC, an amount of $NO_X$ capable of being adsorbed to the three-way catalyst will decrease. For example, in cases where the operation of the internal combustion engine 1 is stopped in a state of the three-way catalyst having been poisoned by HC, the amount of $NO_X$, which can be adsorbed to the three-way catalyst, will decrease at the time of the following starting or warming-up operation of the internal combustion engine 1. In addition, in cases where the internal combustion engine 1 continues a low load operation, there will be a possibility that the three-way catalyst may be deactivated even during the operation of the internal combustion engine 1. In such a case, when the poisoning of the three-way catalyst has been caused by HC, the amount of $NO_X$ capable of being adsorbed to the three-way catalyst will decrease. Thus, if the amount of $NO_X$ capable of being adsorbed to the three-way catalyst decreases, there will be a fear that the amount of $NO_X$ to be discharged into the atmospheric air may increase.

Accordingly, in cases where HC poisoning of the three-way catalyst has occurred, it is desirable to recover the three-way catalyst from HC poisoning in a quick manner. On the other hand, as a result of keen and earnest experiments and verification of the inventor of the present application, it has been found that if the internal combustion engine 1 is driven to operate with the gas fuel at the time when HC poisoning of the three-way catalyst has occurred, HC, which has been adsorbed to the three-way catalyst, is oxidized and removed in a quick manner. Accordingly, there can be considered a method of eliminating HC poisoning of the three-way catalyst by causing the internal combustion engine 1 to operate by the use of the gas fuel at the time of the occurrence of HC poisoning of the three-way catalyst.

However, the gas fuel is low in energy storage density as compared with the liquid fuel, and hence, there is a possibility that an amount of the gas fuel, which can be carried or stored on the vehicle, may decrease. For that reason, when the gas fuel is used each time HC poisoning of the three-way catalyst occurs, the amount of consumption of the gas fuel may become excessively large.

In the HC poisoning elimination processing of this embodiment, the ECU 20 is constructed such that the gas fuel should be used only in cases where HC poisoning of the three-way catalyst can not be eliminated by the use of the liquid fuel. Specifically, the ECU 20 controls in such a manner that only in cases where the temperature of the three-way catalyst is less than a specified value, the internal combustion engine 1 is caused to operate by the use of the gas fuel, whereas in cases where the temperature of the three-way catalyst is not less than the specified temperature, the internal combustion engine 1 is caused to operate by the use of the liquid fuel.

The above-mentioned specified value is a temperature of the exhaust gas purification catalyst at the time when the amount of elimination of HC poisoning per unit time (e.g., the amount of HC which is oxidized by the exhaust gas purification catalyst) becomes more than the amount of HC poisoning per unit time (e.g., the amount of HC adhering to the exhaust gas purification catalyst) in the case where the internal combustion engine is caused to operate with the liquid fuel, and it is a value that has been beforehand obtained by adaptation processing using experiments, etc.

Here, note that the specified value may be made to change in accordance with the measured value of the residual amount sensor 124. For example, when the measured value of the residual amount sensor 124 is large, the specified value may be set to a higher value in comparison with the case where it is small. When the specified value is changed according to the remaining amount of the gas fuel, it becomes possible to carry out the elimination processing of HC poisoning while suppressing the amount of consumption of the gas fuel at the time when the remaining amount of the gas fuel is small, and at the same time, it is also possible to eliminate HC poisoning in a quick manner at the time when the remaining amount of the gas fuel is large. However, if the specified value is set to an excessively high value, an increase in the amount of consumption of the gas fuel will be caused. Therefore, it is desirable that an upper limit guard be set for the specified value.

When the HC poisoning elimination processing is carried out by such a method, it becomes possible to eliminate HC poisoning of the three-way catalyst, while suppressing the amount of consumption of the gas fuel to be small. As a result, it becomes possible to make use of the $NO_X$-adsorption capacity of the three-way catalyst in an effective manner. Moreover, it also becomes possible to avoid a situation where it becomes necessary to supply the gas fuel frequently or a situation where it becomes impossible to use the gas fuel in an operating region in which the gas fuel should be used.

Here, note that as a method of determining whether HC poisoning of the three-way catalyst has occurred, there can be used a method in which an amount of HC (an amount of HC poisoning) having adhered to the three-way catalyst is calculated from the operation history of the internal combustion engine 1, and based on the condition that the amount of HC poisoning thus calculated exceeds an upper limit value, a determination is made that HC poisoning has occurred.

As a specific method of calculating the amount of HC poisoning referred to above, there can be used a method in which a first integrated value, which is an integrated value of a period of time for which the internal combustion engine 1 is operated in an operation region in which HC poisoning is facilitated (hereinafter referred to as "a poisoning operation region"), and a second integrated value, which is an integrated value of a period of time for which the internal combustion engine 1 is operated in an operation region in which HC poisoning is eliminated (hereinafter referred to as "a elimination operation region"), are calculated, and a value which is obtained by subtracting the second integrated value from the first integrated value is made a correlation value for the amount of HC poisoning.

Figure 2:
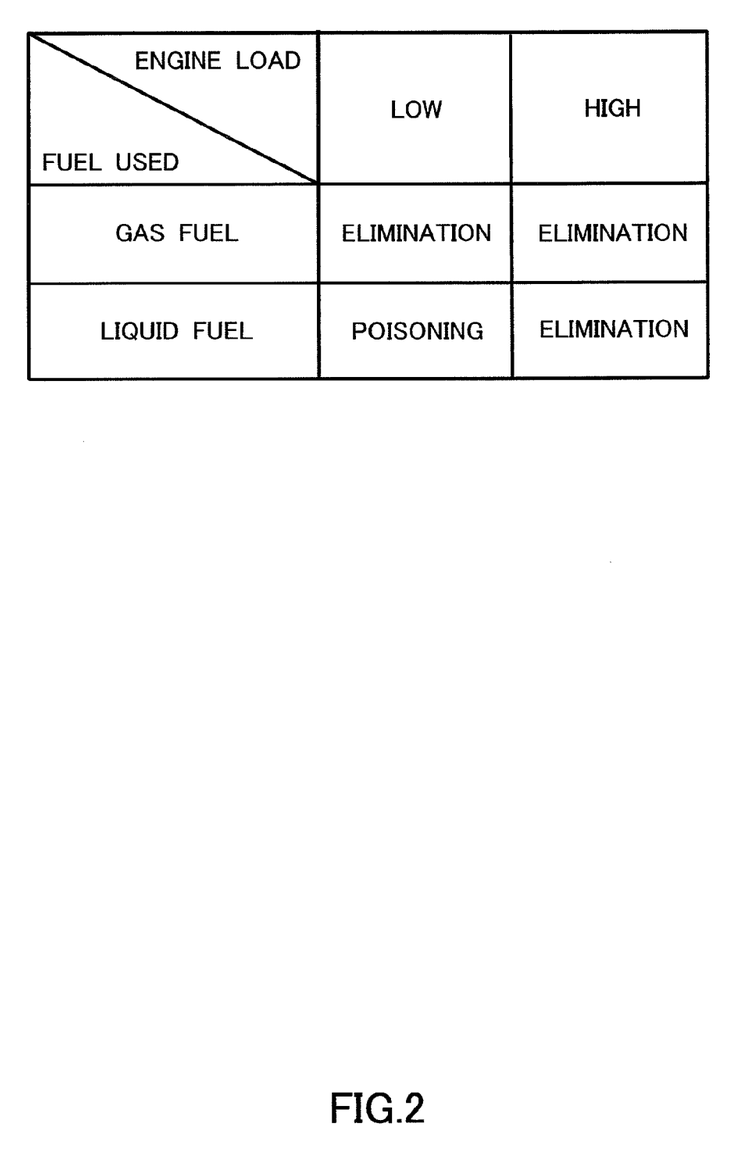
FIG. 2 is a view showing a poisoning operation region and a elimination operation region for each fuel used.

Here, the poisoning operation region and the elimination operation region for each fuel used are shown in FIG. 2. In cases where the internal combustion engine 1 is operated by the use of the gas fuel, HC poisoning is eliminated in an entire region from a low load operation region to a high load operation region. In addition, in cases where the internal combustion engine 1 is operated by the use of the liquid fuel, HC poisoning is facilitated in the low load operation region, whereas HC poisoning is eliminated in the high load operation region.

The low load operation region shown in FIG. 2 is an operation region in which the engine load is lower than an engine load value (hereinafter referred to as a "reference load") at the time when the amount of HC poisoning per unit time and the amount of elimination of HC poisoning per unit time become equal to each other. The above-mentioned reference load should be beforehand obtained by adaptation operations making use of experiments, etc., and stored in a ROM of the ECU 20, etc. Here, note that the reference load may be an engine load at the time when an amount of HC, which flows into the three-way catalyst per unit time, and an amount of HC, which is oxidized by the three-way catalyst per unit time, become equal to each other.

The ECU 20 calculates the above-mentioned first integrated value by integrating a period of time in which the internal combustion engine 1 has been operated in a state where the engine load becomes lower than the above-mentioned reference load, while using the liquid fuel as the fuel of the internal combustion engine 1. In addition, the ECU 20 integrates a period of time in which the internal combustion engine 1 has been operated with the gas fuel, and at the same time, integrates a period of time in which the internal combustion engine 1 has been operated in a state where the engine load becomes equal to or more than the above-mentioned reference load, while using the liquid fuel as the fuel of the internal combustion engine 1, and then calculates the above-mentioned second integrated value by adding those integrated values.

The ECU 20 calculates the correlation value of the amount of HC poisoning by subtracting the above-mentioned second integrated value from the above-mentioned first integrated value. Subsequently, when the correlation value of the amount of HC poisoning exceeds the upper limit value, the ECU 20 makes a determination that the three-way catalyst needs to be recovered from HC poisoning. Here, note that the above-mentioned upper limit value is a value from which it is considered that an amount of exhaust emissions resulting from HC poisoning (an amount of $NO_X$ to be discharged into the atmospheric air) exceeds a regulated value.

In addition, in cases where alcohol is contained in the liquid fuel, the first integrated value may be corrected according to the concentration of alcohol in the liquid fuel. When the alcohol concentration of the liquid fuel is high, the non-methane hydrocarbons contained in the exhaust gas become more as compared with the case where the alcohol concentration of the liquid fuel is low. Therefore, correction may be carried out such that when the alcohol concentration in the liquid fuel is high, the first integrated value becomes larger in comparison with the case where the alcohol concentration in the liquid fuel is low. The concentration of alcohol contained in the liquid fuel may be detected by an alcohol concentration sensor mounted on a liquid fuel passage which extends from the first fuel tank 111 to the first fuel injection valve 11, or may be estimated from a correction coefficient which is used for air fuel ratio feedback control.

Figure 3:
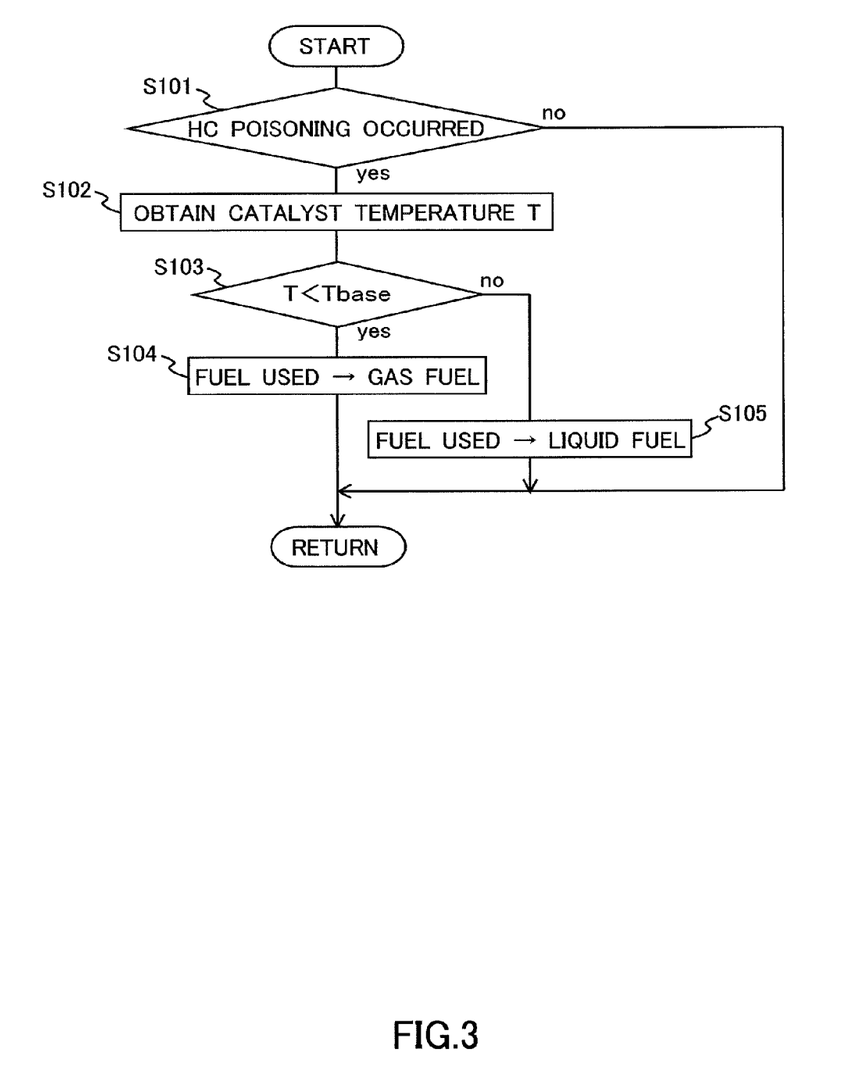
FIG. 3 is a flow chart showing an HC poisoning elimination processing routine.

Hereinafter, the execution procedure of the HC poisoning elimination processing in this embodiment will be described in line with FIG. 3. FIG. 3 is a flow chart showing an HC poisoning elimination processing routine. The HC poisoning elimination processing routine is a routine which has been beforehand stored in the ROM of the ECU 20, etc., and is executed by the ECU 20 in a periodic manner.

In the HC poisoning elimination processing routine, first in S101, the ECU 20 determines whether HC poisoning of the three-way catalyst has occurred. Specifically, the ECU 20 determines whether HC poisoning of the three-way catalyst has occurred, by carrying out an HC poisoning determination processing routine shown in FIG. 4.

Figure 4:
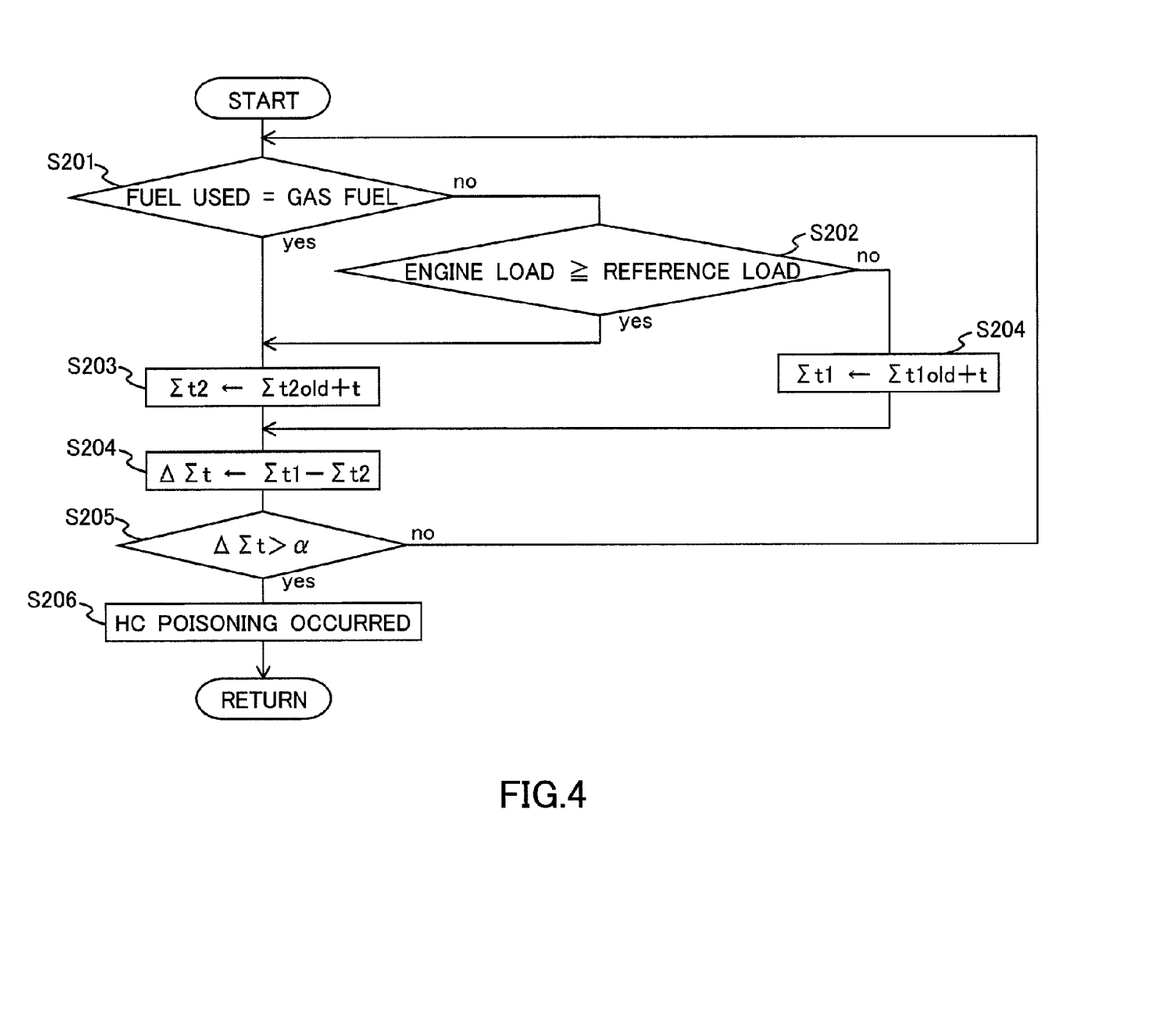
FIG. 4 is a flow chart showing an HC poisoning determination processing routine.

The HC poisoning determination processing routine shown in FIG. 4 is a routine which has been beforehand stored in the ROM of the ECU 20, etc., and is executed by the ECU 20 in a periodic manner. In the HC poisoning determination processing routine shown in FIG. 4, in step S201, the ECU 20 determines whether the fuel used in the internal combustion engine 1 is the gas fuel, i.e., the internal combustion engine 1 is operated with the gas fuel.

In cases where a negative determination is made in the above-mentioned step S201 (the internal combustion engine 1 is operated with the liquid fuel), the ECU 20 goes to step S202. In step S202, the ECU 20 determines whether the engine load is equal to or larger than the above-mentioned reference load.

In cases where an affirmative determination is made in the above-mentioned step S201 (in cases where the internal combustion engine 1 is operated with the gas fuel), or in cases where an affirmative determination is made in the above-mentioned step S202 (in cases where the internal combustion engine 1 is operated under high load while using the liquid fuel), the ECU 20 goes to step S203.

In step S203, the ECU 20 updates the value of the integrated value (the second integrated value) $\Sigma t2$ of the period of time in which the internal combustion engine 1 has been operated in the elimination operation region. Specifically, the ECU 20 updates the second integrated value $\Sigma t2$ ($=\Sigma t2old+\Delta t$) by adding a time $\Delta t$, which corresponds to the execution period of this routine, to the last value $\Sigma t2old$ of the second integrated value.

In cases where a negative determination is made in the above-mentioned step S202 (the internal combustion engine 1 is operated under low load while using the liquid fuel), the ECU 20 goes to step S204. In step S204, the ECU 20 updates the value of the integrated value (the first integrated value) $\Sigma t1$ of the period of time in which the internal combustion engine 1 has been operated in the poisoning operation region. Specifically, the ECU 20 updates the first integrated value $\Sigma t1$ ($=\Sigma t1old+\Delta t$) by adding the time $\Delta t$, which corresponds to the execution period of this routine, to the last value $\Sigma t1old$ of the first integrated value.

Here, note that a calculation unit according to the present invention is achieved by carrying out the processing of the above-mentioned step S203 or the above-mentioned step S204 by means of the ECU 20.

After the execution of the processing of the above-mentioned step S203 or the above-mentioned step S204, the ECU 20 goes to step S205. In step S205, the ECU 20 calculates a difference $\Delta\Sigma t$ ($=\Sigma t1-\Sigma t2$) by subtracting the second integrated value $\Sigma t2$ calculated in the above-mentioned step S203 from the first integrated value $\Sigma t1$ calculated in the above-mentioned step S204.

In step S206, the ECU 20 determines whether the difference $\Delta\Sigma t$ calculated in the above-mentioned step S205 is larger than an upper limit value $\alpha$. In cases where a negative determination is made in step S205 ($\Delta\Sigma t \leq \alpha$), the ECU 20 returns to step S201. On the other hand, in cases where an affirmative determination is made in step S205 ($\Delta\Sigma t > \alpha$), the ECU 20 goes to step S206, in which it makes a determination that HC poisoning of the three-way catalyst has occurred.

Here, note that a determination unit according to the present invention is achieved by the execution of the processing in the above-mentioned step S205 and the above-mentioned step S206 by means of the ECU 20.

Here, a return is made to the HC poisoning elimination processing routine of FIG. 3, and in cases where a negative determination is made in the above-mentioned step S101, the ECU 20 once ends the execution of this routine. On the other hand, in cases where an affirmative determination is made in the above-mentioned step S101, the ECU 20 goes to step S102.

In step S102, the ECU 20 obtains the temperature (catalyst temperature) T of the three-way catalyst. As the catalyst temperature T, the measured value of a temperature sensor, which serves to directly detect the bed temperature of the three-way catalyst, may be used, or the measured value of the exhaust gas temperature sensor 19 may be used. An obtaining unit according to the present invention is achieved by carrying out the processing of step S102 by means of the ECU 20.

In step S103, the ECU 20 determines whether the catalyst temperature T obtained in the above-mentioned step S102 is less than a specified value Tbase. In cases where an affirmative determination is made in step S103 (T<Tbase), the ECU 20 goes to step S104, in which it causes the internal combustion engine 1 to operate with the gas fuel. On the other hand, in cases where a negative determination is made in step S103 (T≥Tbase), the ECU 20 goes to step S105, in which it causes the internal combustion engine 1 to operate with the liquid fuel. Here, note that a control unit according to the present invention is achieved by carrying out the processing of the step S104 or step S105 by means of the ECU 20.

According to the embodiment described above, in the internal combustion engine 1 which is able to use the gas fuel and the liquid fuel, it becomes possible to eliminate HC poisoning of the first exhaust gas purification device 15 (the three-way catalyst), while suppressing the amount of consumption of the gas fuel to a low level.

Here, note that in this embodiment, reference has been made to an example in which a determination as to whether HC poisoning of the three-way catalyst has occurred is made based on the operation history of the internal combustion engine 1 (the difference between the integrated value of the period of time of the poisoning operation and the integrated value of the period of time of the elimination operation), but whether HC poisoning of the three-way catalyst has occurred may be determined based on the amount of $NO_X$ discharged from the first exhaust gas purification device 15. For example, an $NO_X$ sensor may be arranged on the exhaust passage at a location downstream of the first exhaust gas purification device 15 and upstream of the second exhaust gas purification device 16, so that when the measured value of the $NO_X$ sensor exceeds a predetermined value, a determination may be made that HC poisoning of the three-way catalyst has occurred.

DESCRIPTION OF THE REFERENCE NUMERALS AND SYMBOLS 1 internal combustion engine
2 cylinder
3 piston
9 intake passage
10 exhaust passage
11 first fuel injection valve
12 second fuel injection valve
15 first exhaust gas purification device
16 second exhaust gas purification device
17 air fuel ratio sensor
18 $O_2$ sensor
19 exhaust gas temperature sensor
110 first fuel passage
111 first fuel tank
112 first fuel pump
113 first cutoff valve
120 second fuel passage
121 second fuel tank
122 regulator
123 second cutoff valve
124 residual amount sensor

The invention claimed is:

1. A fuel injection control system of an internal combustion engine configured to operate with a liquid fuel and a gas fuel, said system comprising:
a temperature sensor that obtains a temperature of an exhaust gas purification catalyst which is arranged in an exhaust passage of the internal combustion engine; and
a controller comprising at least one processor configured to:
at the time when HC poisoning of said exhaust gas purification catalyst has occurred, cause the internal combustion engine to operate with the gas fuel if the temperature of said exhaust gas purification catalyst is less than a specified value, wherein the specified value is a temperature of the exhaust gas purification catalyst at which the amount of elimination of HC poisoning per unit time is more with respect to the amount of HC poisoning per unit time, and cause the internal combustion engine to operate with the liquid fuel if the temperature of said exhaust gas purification catalyst is not less than the specified value.

2. The fuel injection control system of an internal combustion engine according to claim 1, wherein when a remaining amount of the gas fuel is large, the controller sets the specified value higher in comparison with the time when the remaining amount of the gas fuel is small.

3. The fuel injection control system of an internal combustion engine according to claim 2, further comprising:
the controller calculates a first integrated value which is an integrated value of a period of time for which said internal combustion engine is operated under an operating condition in which said HC poisoning is facilitated, and a second integrated value which is an integrated value of a period of time for which said internal combustion engine is operated under an operating condition in which said HC poisoning is recovered; and
that the controller makes a determination that HC poisoning of said exhaust gas purification catalyst has occurred, at the time when a value obtained by subtracting said second integrated value from said first integrated value exceeds an upper limit value.

4. The fuel injection control system of an internal combustion engine according to claim 3, wherein the internal combustion engine is configured to use a non-methane based hydrocarbon fuel as the liquid fuel, and a natural gas as the gas fuel.

5. The fuel injection control system of an internal combustion engine according to claim 2, wherein the internal combustion engine is configured to use a non-methane based hydrocarbon fuel as the liquid fuel, and a natural gas as the gas fuel.

6. The fuel injection control system of an internal combustion engine according to claim 1, further comprising:
that the controller calculates a first integrated value which is an integrated value of a period of time for which said internal combustion engine is operated under an operating condition in which said HC poisoning is facilitated, and a second integrated value which is an integrated value of a period of time for which said internal combustion engine is operated under an operating condition in which said HC poisoning is eliminated; and
that the controller makes a determination that HC poisoning of said exhaust gas purification catalyst has occurred, at the time when a value obtained by subtracting said second integrated value from said first integrated value exceeds an upper limit value.

7. The fuel injection control system of an internal combustion engine according to claim 6, wherein the internal combustion engine is configured to use a non-methane based hydrocarbon fuel as the liquid fuel, and a natural gas as the gas fuel.

8. The fuel injection control system of an internal combustion engine according to claim 1, wherein the internal combustion engine is configured to use a non-methane based hydrocarbon fuel as the liquid fuel, and a natural gas as the gas fuel.

* * * * *